No. 740,729. PATENTED OCT. 6, 1903.
O. W. YOUNG.
VALVE FOR ENGINES.
APPLICATION FILED NOV. 8, 1900. RENEWED SEPT. 10, 1903.
NO MODEL. 4 SHEETS—SHEET 1.

Witnesses
H. S. Austin
Chas. W. Parker

Inventor
Otis W. Young,
by L. S. Bacon
Attorney

No. 740,729. PATENTED OCT. 6, 1903.
O. W. YOUNG.
VALVE FOR ENGINES.
APPLICATION FILED NOV. 8, 1900. RENEWED SEPT. 10, 1903.
NO MODEL. 4 SHEETS—SHEET 2.

Witnesses
Inventor
Otis W. Young
by L. S. Bacon
Attorney

No. 740,729. PATENTED OCT. 6, 1903.
O. W. YOUNG.
VALVE FOR ENGINES.
APPLICATION FILED NOV. 8, 1900. RENEWED SEPT. 10, 1903.
NO MODEL. 4 SHEETS—SHEET 3.

Witnesses
C. H. S. Austin.
Chas. W. Parker.

Inventor
Otis W. Young
by L. S. Bacon
Attorney

No. 740,729. PATENTED OCT. 6, 1903.
O. W. YOUNG.
VALVE FOR ENGINES.
APPLICATION FILED NOV. 8, 1900. RENEWED SEPT. 10, 1903.
NO MODEL. 4 SHEETS—SHEET 4.
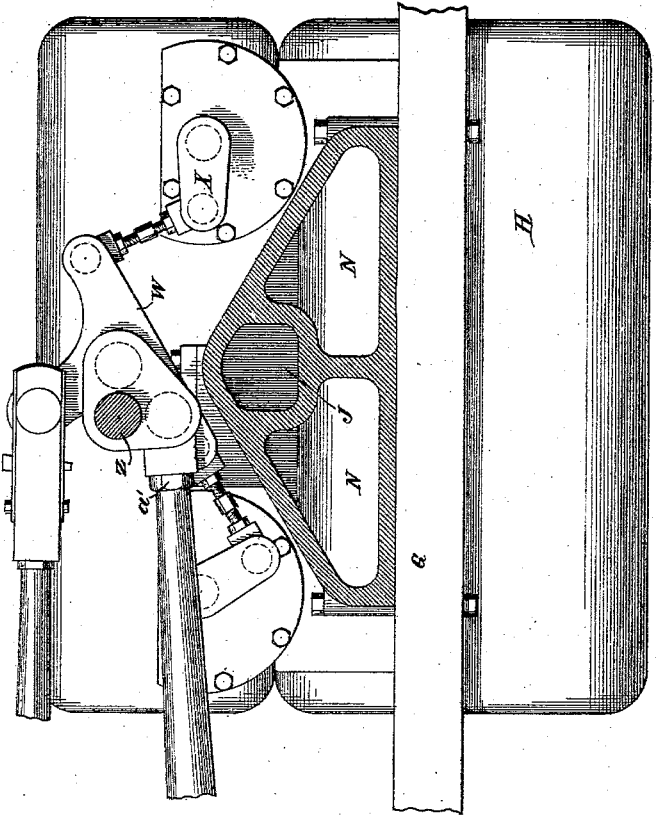
Fig. 10.
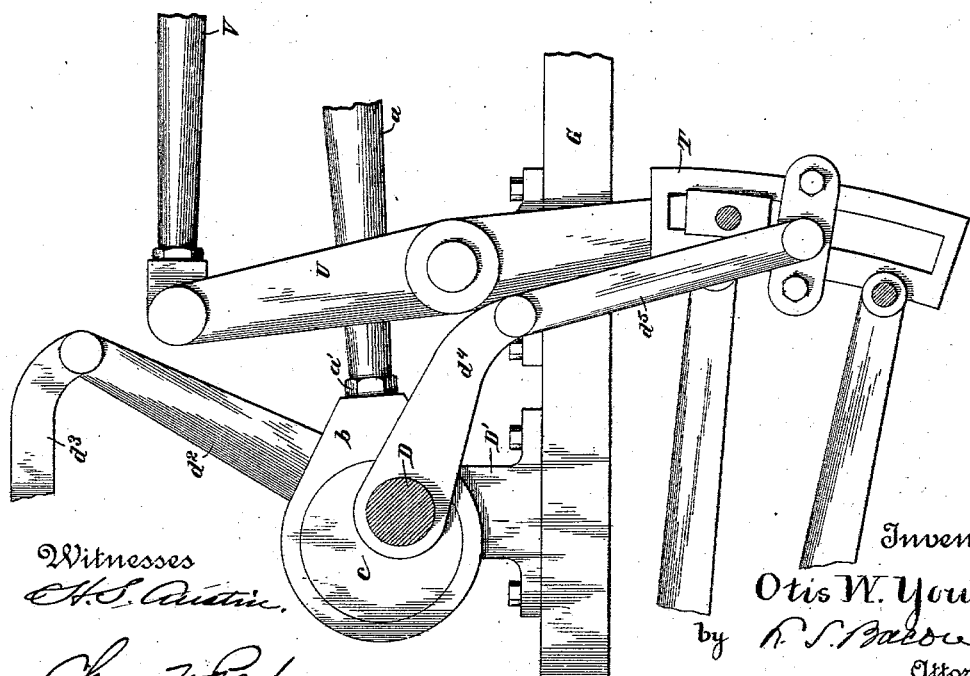
Witnesses
Inventor
Otis W. Young
by
Attorney No. 740,729. Patented October 6, 1903.

UNITED STATES PATENT OFFICE.

OTIS W. YOUNG, OF ROCKFORD, IOWA, ASSIGNOR OF ONE-HALF TO ORVILLE C. MANN, OF NORA SPRINGS, IOWA.

VALVE FOR ENGINES.

SPECIFICATION forming part of Letters Patent No. 740,729, dated October 6, 1903.

Application filed November 8, 1900. Renewed September 10, 1903. Serial No. 172,693. (No model.)

*To all whom it may concern:*

Be it known that I, OTIS W. YOUNG, a citizen of the United States, residing at Rockford, in the county of Floyd and State of Iowa, have invented certain new and useful Improvements in Valves for Engines; and I do hereby declare the following to be a full, clear, and exact description of the invention, such as will enable others skilled in the art to which it appertains to make and use the same.

My invention relates to improvements in engines, more especially in locomotive-engines; and the objects of my improvements are, first, to increase their efficiency; and, second, to decrease the amount of their fuel consumption. To attain these objects, I secure a more economical steam distribution than has heretofore been found practicable by the mechanism hereinafter described, and particularly set forth in the claims forming a part of this specification.

In the accompanying drawings is shown one form of a practical embodiment of the invention, but I wish it distinctly understood that this form is employed for the purpose of illustration and that the improvements are not limited in their useful applications to the particular construction which is there delineated.

Figure 1:
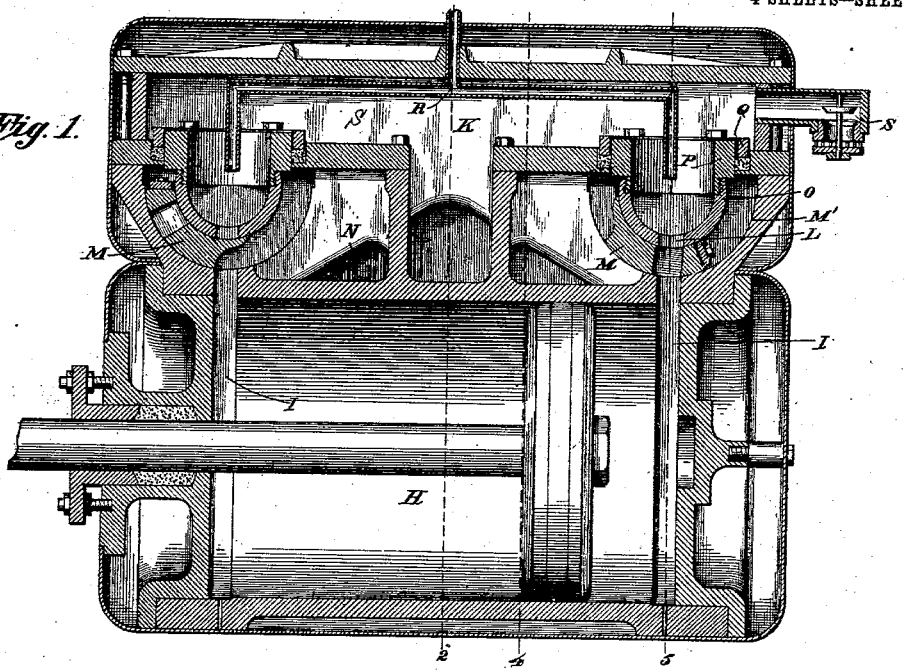
Figure 2:
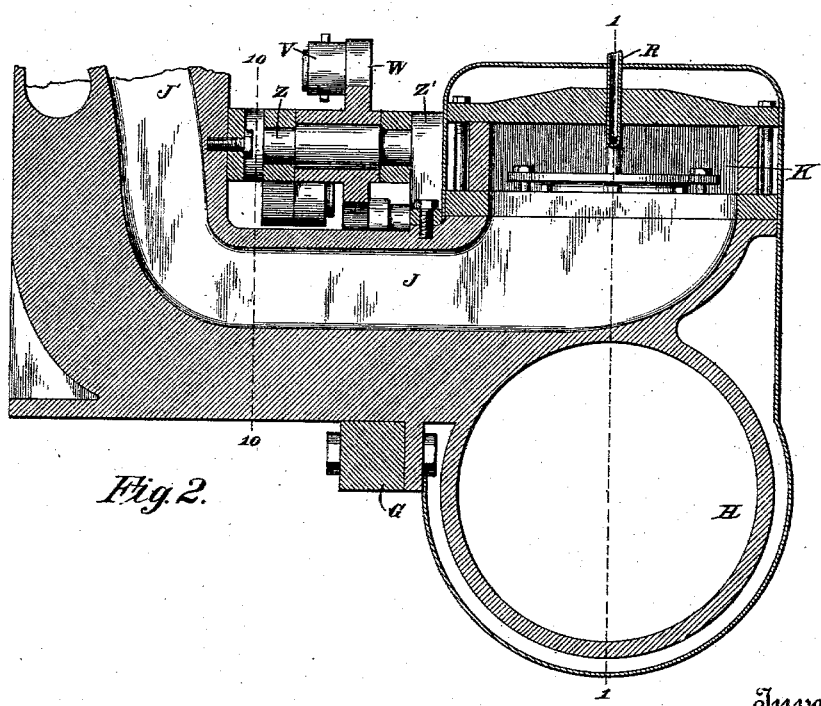
Figure 3:
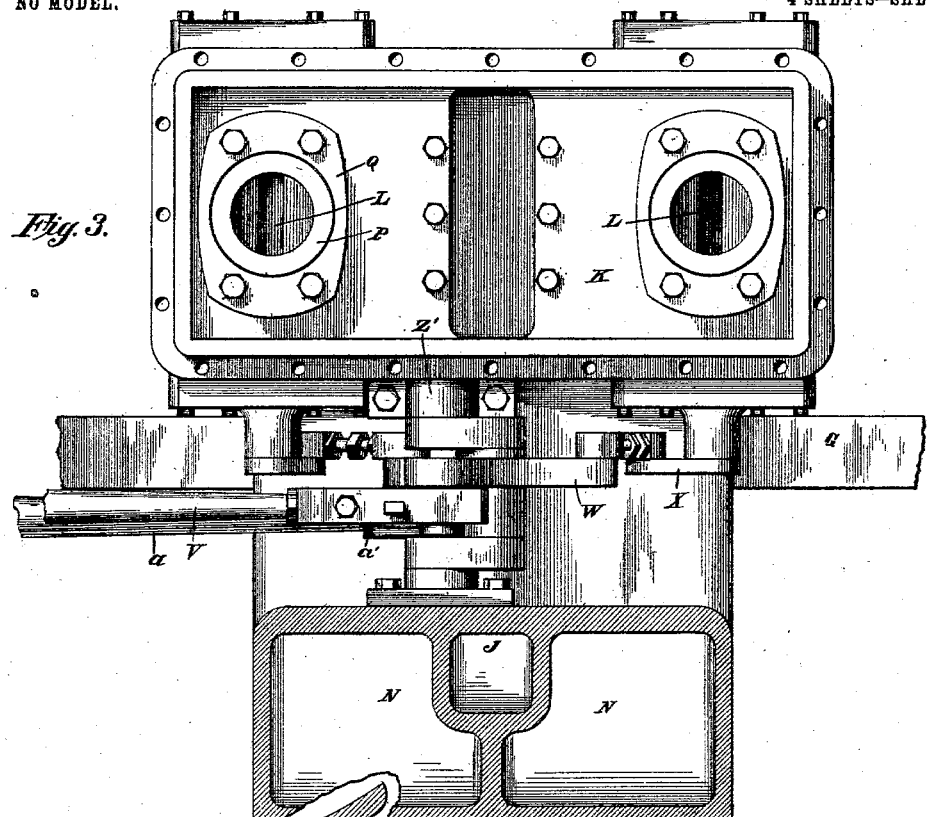
Figure 4:
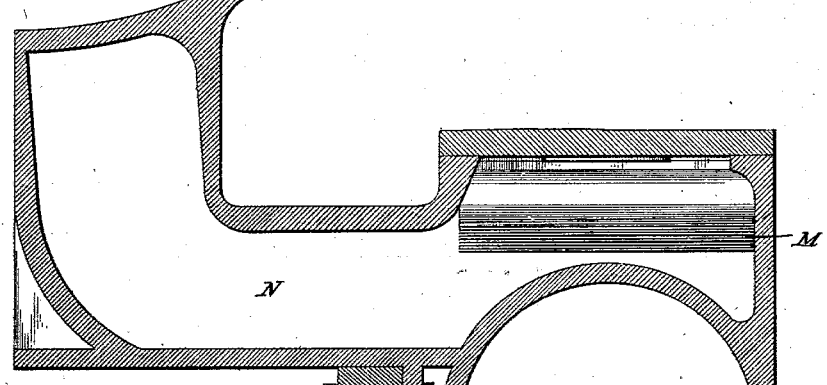
Figure 5:
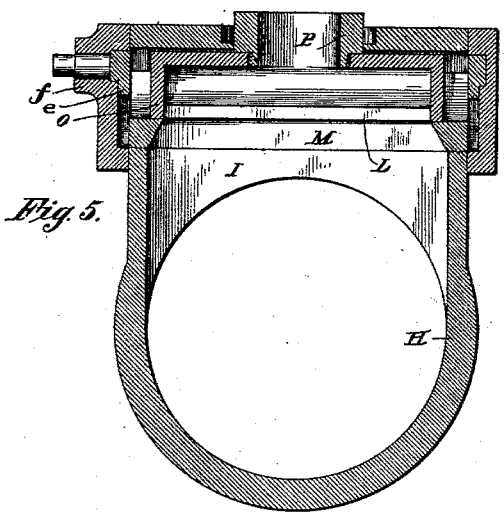
Figure 6:
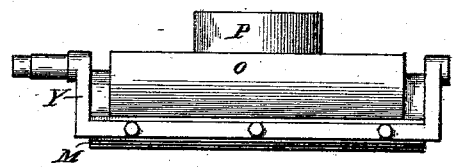
Figure 7:
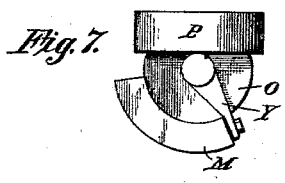
Figure 9:
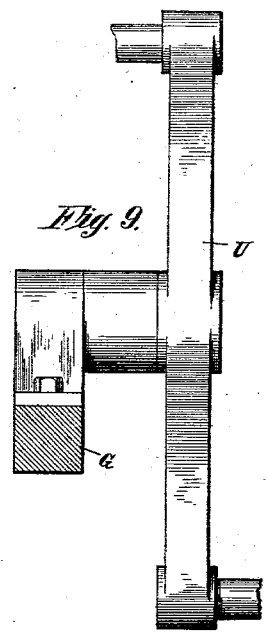
Figure 8:
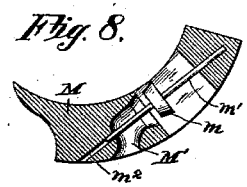

In the drawings, Figure 1 represents a vertical sectional view of a cylinder and steam-chest at the dotted line 1 1, Fig. 2. Fig. 2 shows a sectional view of the cylinder, steam-chest, and valve-gear at the dotted line 2 2, Fig. 1. Fig. 3 is a plan of the steam-chest with cover removed, a top view of the valve-gear, and a sectional view of the steam-passages. Fig. 4 is a sectional view of the cylinder at the line 4 4, Fig. 1. Fig. 5 is a sectional view of the cylinder at the line 5 5. Fig. 6 shows a side view of the valve and steam-chamber. Fig. 7 shows an end view thereof. Fig. 8 is an enlarged sectional view of the valve, showing how it may be fitted with a relief-valve. Fig. 9 is a vertical view of the rocker-arm; and Fig. 10 represents a side view of the valve-gear and a sectional view of the steam-passages at the line 10 10, Fig. 2.

Similar letters refer to similar parts throughout the several views.

In the drawings, G represents a frame, to which the cylinder H is secured in the ordinary manner. The cylinder proper is of the common form, the steam-ports I being directly over each end of the cylinder, as in the Corliss type of engine.

The forms and arrangements of the steam-passages and manner of conducting steam to and from the cylinder are claimed to be an improvement over methods previously used. Steam or other motive agent enters a steam-passage J at J', Fig. 2, flows into the steam-chest K, Fig. 1, enters an opening L, Figs. 1, 3, and 5, and is conducted through a valve M into the cylinder. The exhaust flows through the opposite steam-port I, Fig. 1, into an exhaust-passage N, Figs. 1, 3, and 4, thence through the smoke-stack to the atmosphere. The valves M, Figs. 1, 4, 5, 6, and 8, of which there are two, as plainly shown in the drawings, are formed to slide back and forth on semicircular valve-seats M', and the upper surface of the valves slide against semicircular hollow cavities or steam-chambers O. These chambers are provided with tubular projections P, which pass through stuffing-boxes Q to the steam-chest S and are held in position against the valves by steam-pressure from above. It is clearly apparent that if the valves and their engaging surfaces are formed to fit each other steam-tight there will be very little friction between these parts, as the pressure upon the valves need be only sufficient to balance them well. The amount of this pressure will depend upon the amount of area in the end of the circular tube P, Fig. 3. This arrangement nicely balances the valves, and should the cylinder-pressure at any time exceed that of the steam-chest permits the valves to rise from their seats until the pressure is equalized.

S indicates the common form of release-valve for supplying air to the cylinder when not working steam.

The valves are operated by eccentrics (not shown) and the common form of link T, Fig. 10, which, through a rocker-arm U, rod V, wrist-plate W, and cranks X, connected with the valves, Figs. 5, 6, and 7, impart an oscillating motion to the valves. The valve-yokes Y, Figs. 5, 6, and 7, may be fastened to the valve by bolts and nuts, as shown, or other suitable fastening, but this fastening must be sufficiently pliable or loose to allow close contact between the valves and their seats; also to permit them to rise slightly from their seats. It will be observed that the stems of the valves M, to which the cranks X are secured, pass through the walls of the valve-chambers at a place where they are not subject to leakage of live steam. The only leakage that can occur will be from exhaust-steam at a comparatively low pressure, thus obviating the necessity for packing the valve-stems, and it being only necessary to have a close fit between the collars on the valve-stems and the bonnets $f$.

In Fig. 8 I have shown the valve M provided with a small release-valve or auxiliary valve $m$, having a stem $m'$, guided and working in holes $m^2$ in the valves M. This valve $m$ controls a port M', adapted to communicate with the inlet-port I of the cylinder. The release-valves $m$ permit the escape of steam when the pressure is excessive in the cylinder without the necessity of the valves M lifting from their seats. It will be observed that steam thus escaping is not lost, but flows back into the steam-chamber, and in the event of an engine running at a high rate of speed with steam shut off (as going down-grade, for instance) the value of this valve will be appreciated as serving to lessen the wear and jar which would otherwise be caused by the main valves being continually lifted from their seats.

The wrist-plate W is mounted on a crank of a crank-shaft Z, journaled at its ends in bearings Z', located between the steam-chests and the upwardly-extending portion of the walls of the exhaust-passages, and this shaft is held in a stationary position by the rod $a$, which is adjustably connected to the crank-shaft and to an eccentric-strap $b$, as by means of adjusting-nuts $a'$. The eccentric-strap embraces an eccentric $c$, rigidly secured to a lifting-shaft D, journaled in suitable bearings D', carried by a suitable part, as the frame G. The shaft D is provided with a rock-arm $d^2$, having connected thereto an operating-rod $d^3$. The shaft D is also connected, as by an arm $d^4$ and link-hanger $d^5$, to the link T. The result of this construction is that when the link T is raised by turning the lifting-shaft to a central position the eccentric $c$, turning with the shaft, will change the position of the crank-shaft Z through the rod $a$ and will lower the bearing of the crank-shaft Z, upon which the wrist-plate W oscillates, and as the link T is raised to its upper position the crank-shaft Z will be moved back to its former position. The effect upon the valves of this lowering of the wrist-plate bearing as the link approaches a central position will be to change their relative positions toward each other, forcing them farther apart, for a purpose hereinafter explained.

R indicates a lubricant-pipe having branches leading into the passage to the valves, where the suction of steam flowing through these passages will prevent the flow of lubricant from becoming clogged in the pipe, and as every portion of the valves and their engaging surfaces are at some period of their movement exposed either to live or exhaust steam saturated with lubricant a perfect lubrication of all of the parts subject to friction is the result.

By means of a mechanism such as above described I attain the following important advantages:

First. A better distribution of steam through a more perfect valve-action than any of which I am aware as applied to locomotives, as a careful study of the principles governing the action of the valve will show that the valve for admission is completely closed before the valve on the exhaust side commences to close and that the exhaust-valve is wide open before the valve for admission commences to open; also, a more rapid opening and a quicker closing of the admission-valve is attained by means of the wrist-plate action than is practicable by any other known means, thus letting steam into the cylinders at a higher pressure at the beginning of the piston-stroke and cutting it off by a more decisive action, thereby avoiding wiredrawing and getting better results from expansion, and in addition to this giving a much more free exhaust.

Second. It is a well-known fact that in locomotives running at a high rate of speed it is much more difficult to exhaust steam from the cylinders than it is to admit steam. This is principally due to the fact that with link-motion and slide-valve in general use engines are invariably run with the link raised toward a more central position as the speed increases, thus cutting off the period of admission shorter and not only using steam more economically, but reducing the amount of steam to be exhausted. One of the defects, however, of this method is that shortening the period of admission also contracts the opening for exhaust and chokes the free exhaust just at the time it is most needed. Another defect is that as the cut-off is shortened the lead of the valve is correspondingly increased, these two facts resulting in more compression and preadmission than are necessary to cushion the piston, and a very decided back pressure is thereby created, which causes a serious loss of power and makes it difficult and expensive to attain as high a rate of speed as is frequently desired. These defects are fully overcome by the mechanism herewith described for lowering and raising the bearing upon which the wrist-plate rotates, for it is apparent that as the link approaches a central position, thus lowering the wrist-plate bearing and a consequent change in the relative adjustment of the valves, the increased lead is counteracted and rendered as nearly uniform for the different points of cut-off as is desired and at the same time the other valve is readjusted in an opposite direction, causing the exhaust side to open earlier and close later in proportion as the cut-off is shortened, thus causing an earlier prerelease and a later compression as well as less preadmission. The exact amount of this changeable adjustment desired must be determined by the designer in proportioning the parts to fill the requirements for the service expected of each engine built, as either a uniform or any desired variation of lead is practicable under this form of invention. It will be observed that this changeable adjustment is equally operative for the back-up as well as the forward motion.

Third. The amount of lead can be changed in an engine constructed upon this plan to meet the requirements of different kinds of service in a few minutes by turning the adjusting-rod, either lengthening or shortening its connection between the eccentric c and the crank-shaft Z.

Fourth. The arrangement of the steam-passages from the smoke-box to the cylinders is claimed to be a decided improvement, as the passage J for steam from the boiler is surrounded on three sides by the passages N for the exhaust, thus lessening very materially loss of heat by radiation to the steam before it has done its work and allowing it to reach the steam-chest at practically boiler-pressure, while the very large passages for the exhaust tend to increase the freedom with which the cylinder is cleared after the steam has done its work, and the plan of having two exhaust-passages entirely disconnected until they nearly reach the nozzle enables them to become more nearly cleared in the interval between each exhaust.

Fifth. The construction of the rocker-arm, as shown in Fig. 9, with the upper and lower ends directly opposite each other secures excellent mechanical action, and the valve-gear, as shown in the drawings, is placed in compact form and arranged inside the frame and wheels close to the center of the engine.

While my invention is shown in the foregoing as peculiarly applicable to locomotive-engines, it is clearly apparent that many features of this invention are equally applicable to stationary engines.

While I have particularly described and stated the function and purpose of the valve-gearing, I desire it understood that that subject-matter has been made the subject-matter of a separate application, filed August 1, 1901, Serial No. 70,511, and that by not claiming it herein I have not abandoned or dedicated any feature or invention therein contained.

I claim—

1. The combination with a cylinder, and a steam-chest, of a substantially semicircular valve-seat in the steam-chest, a substantially semicircular live-steam chamber concentric with said valve-seat, a curved valve working between said seat and chamber, said valve, steam chamber and chest having ports adapted to register in one position of the valve, substantially as described.

2. The combination with a steam-cylinder, and a steam-chest, of a substantially semicircular valve-seat in the steam-chest, a substantially semicircular live-steam chamber concentric with said valve-seat, a curved valve working between said seat and chamber, said steam chamber and chest having ports adapted to establish communication between the steam chamber and cylinder in one position of the valve, said steam-chamber being movable and held against the valve by steam-pressure, substantially as described.

3. The combination with a cylinder, and a steam-chest, of a substantially semicircular valve-seat in said steam-chest, a substantially semicircular live-steam chamber concentric with said valve-seat, a curved valve working between said live-steam chamber and said valve-seat, yokes connected to said valve and having journals mounted in said steam-chest, one of said journals extending through the walls of the chest, and operating means for said valve connected to said journal, substantially as described.

4. The combination with an oscillating steam-admission valve, of a relief-valve carried thereby for relieving excessive cylinder-pressure, substantially as described.

5. The combination with a steam-chest, of a live-steam passage communicating therewith, and exhaust-steam passages partially surrounding said live-steam passage, substantially as described.

6. The combination with a cylinder and a steam-chest, of partitions dividing said chest into separated exhaust-passages adapted to communicate directly with the ports to the cylinder, a live-steam passage located between and partially surrounded by the exhaust-steam passages, and live-steam chambers in the chest with which said live-steam passage directly connects, substantially as described.

In testimony whereof I affix my signature in presence of two witnesses.

OTIS W. YOUNG.

Witnesses.
C. W. WICKS,
C. E. BUNDY.